United States Patent
Lee et al.

(10) Patent No.: US 10,469,900 B2
(45) Date of Patent: Nov. 5, 2019

(54) DISPLAY APPARATUS CONFIGURING A MULTI DISPLAY SYSTEM AND CONTROL METHOD THEREOF

(71) Applicant: SAMSUNG ELECTRONICS CO., LTD., Suwon-si, Gyeonggi-do (KR)

(72) Inventors: Chang-won Lee, Incheon (KR); Jung-keun Kim, Hwaseong-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 115 days.

(21) Appl. No.: 15/666,680

(22) Filed: Aug. 2, 2017

(65) Prior Publication Data

US 2018/0063578 A1    Mar. 1, 2018

(30) Foreign Application Priority Data

Aug. 24, 2016   (KR) .................. 10-2016-0107939

(51) Int. Cl.
| | |
|---|---|
| H04N 21/2347 | (2011.01) |
| H04N 21/4408 | (2011.01) |
| G06F 3/14 | (2006.01) |
| G06F 21/60 | (2013.01) |
| H04L 29/06 | (2006.01) |
| H04N 21/4405 | (2011.01) |
| H04N 21/4363 | (2011.01) |
| G06F 21/84 | (2013.01) |
| G09G 5/00 | (2006.01) |

(52) U.S. Cl.
CPC ....... *H04N 21/4408* (2013.01); *G06F 3/1446* (2013.01); *G06F 21/602* (2013.01); *G06F 21/606* (2013.01); *G06F 21/84* (2013.01); *H04L 63/0464* (2013.01); *H04N 21/43632* (2013.01); *H04N 21/4405* (2013.01); *G09G 5/006* (2013.01); *G09G 2358/00* (2013.01); *G09G 2370/045* (2013.01); *G09G 2370/10* (2013.01); *G09G 2370/12* (2013.01)

(58) Field of Classification Search
CPC .......................... H04L 63/04; H04N 21/2347; H04N 21/4405; H04N 21/4408
See application file for complete search history.

(56) References Cited

U.S. PATENT DOCUMENTS

| | | |
|---|---|---|
| 6,976,265 B1 | 12/2005 | Yang et al. |
| 8,201,212 B2 | 6/2012 | Goto et al. |
| 8,854,345 B2 | 10/2014 | Sisto et al. |

(Continued)

FOREIGN PATENT DOCUMENTS

| | | |
|---|---|---|
| JP | 4352797 | 10/2009 |
| JP | 4986708 | 7/2012 |
| KR | 10-2012-0032118 | 4/2012 |

*Primary Examiner* — Izunna Okeke
(74) *Attorney, Agent, or Firm* — Nixon & Vanderhye P.C.

(57) ABSTRACT

A display apparatus of a multi-display system is disclosed. The display apparatus includes a display, an input connector configured to receive an input of an image which is encrypted based on HDCP, an output connector which is connected with another display apparatus of the multi-display system, and a processor configured to control the display to display an image corresponding to the display apparatus by decrypting the encrypted image and to re-encrypt the decrypted image to transmit to the another display apparatus through the output connector.

11 Claims, 6 Drawing Sheets

(56) References Cited

U.S. PATENT DOCUMENTS

| | | |
|---|---|---|
| 9,131,268 B2 | 9/2015 | Min |
| 2007/0220279 A1* | 9/2007 | Northcutt .......... H04L 25/03159 713/193 |
| 2015/0220300 A1* | 8/2015 | Reynaga ............... G06F 3/1431 345/1.3 |
| 2016/0329030 A1 | 11/2016 | Lee et al. |

* cited by examiner

DISPLAY APPARATUS CONFIGURING A MULTI DISPLAY SYSTEM AND CONTROL METHOD THEREOF

CROSS-REFERENCE TO RELATED APPLICATION

This application is based on and claims priority under 35 U.S.C. § 119 to Korean Patent Application No. 10-2016-0107939, filed in the Korean Intellectual Property Office on Aug. 24, 2016, the disclosure of which is incorporated by reference herein in its entirety.

BACKGROUND

1. Field

The present disclosure relates generally to a display apparatus and a control method thereof, and for example, to a plurality of display apparatuses configuring a multi-display system and a control method thereof.

2. Description of Related Art

In general, a display device is a device that displays one or more images on one screen. However, the display device may be connected to a plurality of display devices and may perform a multi-display function to display an image on a plurality of screens. A representative example of such a multi-display system may be a video wall system.

A video wall is provided by arranging a plurality of display devices that can output images on plane and making the plurality of display devices output respective parts of one image, and thus the plurality of display devices act as one display device having a large screen. For example, the video wall includes a plurality of display apparatuses and the display apparatuses respectively display an identical image or different images so that the images may be combined in a single entire image.

With respect to such a video wall system, if an image encrypted based on High-bandwidth Digital Content Protection (HDCP) is displayed, in existing systems, the encrypted image is displayed on a first display apparatus connected with a source apparatus by being decrypted, and the decrypted image is consecutively transmitted to other connected display apparatuses display and displayed.

However, in such an existing method, after an image is decrypted once in a first display apparatus of a video wall system, the decrypted image is transmitted to other connected display apparatuses consecutively, and thus, a problem such as leaking of a decrypted image by hacking may occur in the process.

Accordingly, with respect to the multi-display system, there has been a need for schemes to protect a copy right of an image encrypted based on HDCP.

SUMMARY

Example embodiments relate generally to a multi-display system including a plurality of display apparatuses to protect an image encrypted based on HDCP from an external and a control method thereof According to an example embodiment, a display apparatus configuring a multi-display system is provided, the display apparatus including: a display; an input connector configured to receive an input of an image encrypted based on High-bandwidth Digital Content Protection (HDCP); an output connector connected with another display apparatus of the multi-display system; and a processor configured to control the display to display an image corresponding to the display apparatus by decrypting the encrypted image and to re-encrypt the decrypted image to transmit to the another display apparatus through the output connector.

The processor may be configured to transmit HDCP state information which indicates whether a first display apparatus which receives the re-encrypted image through the output connector decrypts and re-encrypts an image received from the display apparatus and transmits the image to a second display apparatus connected to the first display apparatus, to the first display apparatus.

The apparatus may further include a user interface unit comprising interface circuitry, wherein the processor transmits the HDCP state information which is generated based on a user command input through the user interface to the first display apparatus.

The processor may transmit the HDCP state information through an auxiliary channel included in the output connector.

The input connector may receive, from an apparatus connected with the input connector, HDCP state information which indicates whether to transmit an image received from the apparatus connected with the input connector to the another display apparatus after decrypting and re-encrypting the image, and wherein the processor may determine whether to re-encrypt an image which is to be transmitted to the another display apparatus based on the HDCP state information.

The input connector may include at least one of a High Definition Multimedia Interface (HDMI), a Digital Video/visual Interface (DVI) and a display port (DP), and wherein the output connector may include a DP.

According to an aspect of another example embodiment, a control method of a display apparatus configuring a multi-display system is provided, the method including: receiving an image which is encrypted based on HDCP through an input connector; and displaying an image corresponding to the display apparatus by decrypting the encrypted image and transmitting the decrypted image by re-encrypting the decrypted image to another display apparatus configuring the multi-display system through the output connector.

The transmitting may include transmitting HDCP state information which indicates whether a first display apparatus which receives the re-encrypted image through the output connector decrypts and re-encrypts an image received from the display apparatus and transmits the image to a second display apparatus connected to the first display apparatus, to the first display apparatus.

The transmitting may include transmitting the HDCP state information which is generated based on a user command to the first display apparatus.

The transmitting may include transmitting the HDCP state information through an auxiliary channel included in the output connector.

The method may further include: receiving, from an apparatus connected with the input connector, HDCP state information which indicates whether to transmit an image received from the apparatus connected with the input connector to the another display apparatus after decrypting and re-encrypting the image; and determining whether to re-encrypt an image which is to be transmitted to the another display apparatus based on the HDCP state information.

The input connector may include at least one of an HDMI, a DVI and a DP, and wherein the output connector may include a DP.

According to an aspect of yet another example embodiment, a multi-display system including a plurality of display apparatuses is provided, the system including: a first display apparatus configured to transmit an image encrypted based on HDCP and HDCP state information to a second display apparatus; and the second display apparatus configured to display an image corresponding to the second display apparatus by decrypting the encrypted image, to determine whether to re-encrypt the decrypted image based on the HDCP state information, and to transmit the decrypted image or a re-encrypted image based on a determination result, to a third display apparatus.

According to the various example embodiments, a multi-display system may prevent and/or reduce the possibility of an image encrypted based the HDCP being encoded and illegally copied to an external device.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
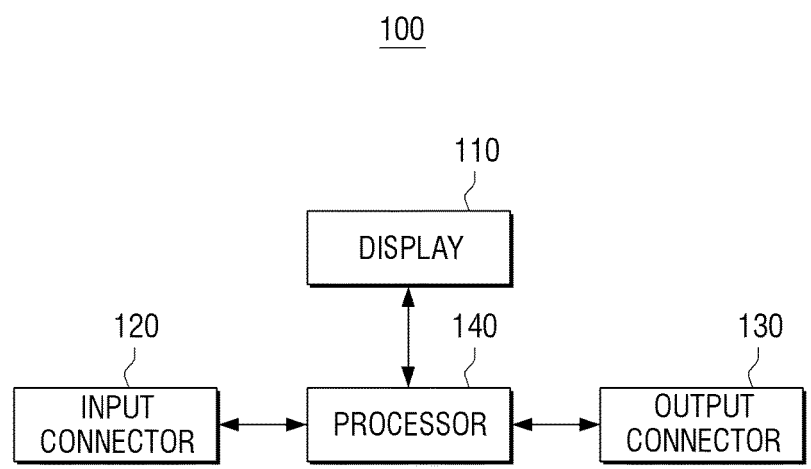
FIG. 1 is a block diagram illustrating an example configuration of a display apparatus of a multi-display system according to an example embodiment.

Prior to describing various example embodiments of the present disclosure, an explanation will be made on a method by which embodiments of the present specification and drawings are disclosed.

The terms used in the present disclosure and the claims are general terms selected in consideration of the functions of the various embodiments of the present disclosure. However, these terms may vary depending on intention, legal or technical interpretation, emergence of new technologies, and the like of those skilled in the related art. Further, some of the terms may be arbitrarily selected. Unless there is a specific definition of a term, the term may be construed based on the overall contents and technological common sense of those skilled in the related art.

Further, like reference numerals indicate like components that perform substantially the same functions throughout the specification. For the sake of explanation and understanding, different embodiments are described with reference to like reference numerals. That is, even if all the components in the plurality of drawings have like reference numerals, it does not mean that the plurality of drawings refer to only one embodiment.

Further, the terms including numerical expressions such as a first, a second, and the like may be used to explain various components, but there is no limitation thereto. These terms are used only for the purpose of differentiating one component from another, without limitation thereto. For example, a numerical expression combined with a component should not limit the order of use or order of arrangement of the component. When necessary, the numerical expressions may be exchanged between components.

The singular expression also includes the plural meaning as long as it does not conflict with the context. In this disclosure, terms such as "include" and "have/has" should be understood as designating that there are such characteristics, numbers, operations, elements, components or a combination thereof in the disclosure, not to exclude the existence or possibility of adding one or more of other characteristics, numbers, operations, elements, components or a combination thereof In the embodiments of the present disclosure, terms such as "module", "unit", "part", and the like are terms used to indicate components that perform at least one function and operation, and these components may be realized in hardware, software or in combination thereof. Further, except for when each of a plurality of "modules", "units", "parts", and the like needs to be realized in an individual hardware, the components may be integrated in at least one module or chip and be realized in at least one processor (not illustrated).

Further, in various example embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component.

Hereinafter, various example embodiments of the present disclosure will be described in greater detail with reference to the drawings.

FIG. 1 is a block diagram illustrating an example configuration of a display apparatus configuring a multi-display system according to an example embodiment.

Referring to FIG. 1, a display apparatus (100) configuring a multi-display system according an example embodiment includes a display 110, an input connector 120, an output connector 130 and a processor (e.g., including processing circuitry) 140.

Herein, the multi-display system is a system which displays a single image by a plurality of display apparatuses operating as a single screen or displays a plurality of images, respectively. A typical example of the multi-display system is a video wall system which forms a large screen by stacking a plurality of display apparatuses up and displaying various images on the large screen by receiving an image signal from a source apparatus. Hereinafter, as an example of a multi-display system, a video wall system is introduced and described. However, the disclosure is not limited to a video wall system, and may be applied to various display systems which display a single image or a plurality of images by using a plurality of display apparatuses.

The display device 100 may include not only devices that are fixedly arranged in specific places, such as a TV and a desk top PC, but also various types of devices that can be easily carried by individuals to output specific image signals, such as a PDA, a PMP, and a portable terminal.

The display 110 is configured to display an image based on an image signal that is processed by the processor 140.

The display 110 may include various types of displays that can display images, such as a cathode ray tube (CRT), a liquid crystal display (LCD), a light emitting diode (LED) display, and a plasma display panel (PDP), or the like, but is not limited thereto. The display 110 may additionally include an additional configuration in accordance with its implementation type. For example, in the case where the display 110 is of a liquid crystal type, it may include an LCD panel, a backlight unit that supplies light to the LCD panel, and a panel driver board that drives the LCD panel.

The input connector 120 is configured to receive an input of a image signal from a display apparatus or a source apparatus which is adjacent to the display apparatus 100. Herein, the input connector 120 may include, for example, and without limitation, at least one daisy chain source among a plurality of ports to receive an image signal such as a DVI, a DP, an HDMI, a component, etc. herein, the source apparatus can transmit an image signal to each display apparatus configuring the multi-display system, and may include a personal computer (PC), a DVD player, a BD player, a PVR, an external server and a web server.

The input connector 120 may include an input port to control the display apparatus in addition to the described input connector of the image signal. In addition, the input connector 120 may include a detection port which can check a connection with a peripheral display apparatus. In addition, the input connector 120 may include various input ports according to a need.

The output connector 130 is configured to transmit an image signal to a display apparatus adjacent to the display apparatus 100. Herein, the output connector 130 also may include, for example, and without limitation, at least one daisy chain source among the DVI, the DP, the HDMI, the component, etc., and, the output connector 130 may be embodied as a DP type connector including an auxiliary channel.

The processor 140 may include various processing circuitry and is a component that is configured to control a general operation of the display apparatus 100. The processor may process an image corresponding to the display apparatus 100 from the input images. In addition, the processor 140 may obtain information from the input image, and generate various commands necessary to control the display apparatus 100.

The processor 140, in response to the display apparatus 100 being woken up, may transmit a wake-up signal to a display apparatus connected with the output connector 130 so that a state of the adjacent display apparatus to be converted to an operation state.

The processor 140, in response to information necessary for image processing being obtained by de-packaging and parsing the input image and the parsing being completed, may transmit the parsed image to the adjacent display apparatus by re-packaging the parsed image. Herein, the information necessary for processing the parsed and obtained image may be, for example, information regarding loop-out of the input image, DP configuration information, resolution information, source information, frame information and DP condition information, etc. If the parsed image is re-packaged, the re-packaged image is transmitted to the adjacent display apparatus connected with the output connector 130 of the display apparatus 100.

The processor 140 may perform cropping the input image in a plurality of numbers according to the numbers of display apparatuses configuring the multi-display system, and generate an image corresponding to the display apparatus 100 in a method of scaling to correspond to the resolution of the display apparatus 100. By cropping, except a portion which is to be output on the display apparatus 100, the rest of the image may be omitted. The processor 140 may scale the cropped image into a size of the intrinsic resolution of the display apparatus 100.

The processor 140 may convert the input image into a DP format and transmit the DP format to an adjacent display apparatus.

A display port (DP) refers to a future display interface and a connection formation which is broadly used for a PC, a monitor, a panel, a projector and a high-resolution contents application program, etc. The DP enables a physical connection of a source apparatus and a sink apparatus with a main link, an auxiliary channel and a hot plug detect (HPD) signal line. In the present disclosure, the sink apparatus pertains to each display apparatus configuring a multi-display system, and detailed description according thereto will be described later.

Meanwhile, through the auxiliary channel, the processor 140 may exchange data to control the source apparatus or the adjacent display apparatus connected with the display apparatus 100 and a multi-display system link management, and data to control a plurality of display apparatuses configuring a multi-display system.

The auxiliary channel is a half duplex two-way channel and configured with a single differential pair. It has a 1 Mbps bandwidth and used to initialize and configure a link. Specifically, the auxiliary channel enables managing a link, controlling each display apparatus and transmitting two-way high speed data. By setting a differential voltage range through a link training process and through equalizer optimization, power saving data transmission and data transmission optimization are possible, and through a high-speed data transmission, USB 2.0, CAM and Interface Unit or a control signal transmission is possible through a single DP cable.

Meanwhile, according to an example embodiment, an image encrypted based on HDCP may be input through the input connector 120. Herein, the HDCP refers to a protocol which is encrypted for avoiding an illegal reproduction of image content, and the HDCP is copyright protection technology to avoid contents such as images being illegally reproduced by encrypting a path for transceiving a digital signal from a source apparatus to a display apparatus such as a display apparatus. It is a protocol to avoid a reproduction by applying encryption technology to content and a reproduction apparatus such as a display apparatus and checking each other's codes. The HDCP may be applied to content such as an image itself When an image encrypted based on the HDCP is input, the processor 140 may decrypt the input image and control the display 110 to display an image corresponding to the display apparatus 100. Herein, the processor 140 may re-encrypt the decrypted image and transmit the re-encrypted image to another display apparatus through the output connector 130.

Specifically, the processor 140 may control to transmit HDCP state information which indicates whether a display apparatus (hereinafter, referred to as 'a first display apparatus') which receives the re-encrypted image through the output connector 130 decrypts and re-encrypts an image received from the display apparatus 100 and transmits the image to another display apparatus (hereinafter referred to as 'a second display apparatus') connected through the output connector of the first display apparatus, to the first display apparatus. Specifically, the first display apparatus may decrypt the image received from the display apparatus 100, generate an image corresponding to the first display apparatus and display the image. Herein, the first display apparatus may transmit the decrypted image to the second display apparatus without a re-encryption, or may re-encrypt the decrypted image and transmit to the second display apparatus. In this case, based on HDCP state information received from the display apparatus 100, the first display apparatus may determine whether to re-encrypt an image to be transmitted to the second display apparatus or not. The HDCP state information may be transmitted to other display apparatuses consecutively connected through the output connectors of the respective display apparatuses.

Meanwhile, according to an example embodiment, the display apparatus 100 may further include a user interface 180 (see FIG. 5), and the processor 140 may transmit the HDCP state information to the first display apparatus based on a user command input through the user interface 180. The display apparatus 100 may display a user interface (UI) menu for selecting whether for display apparatuses configuring the multi-display system to respectively encrypt and transmit the image which is to be displayed by the multi-display system. According to a user command on the displayed UI menu, the display apparatus 100 may transmit an image to be displayed by the multi-display system by encrypting the image or without encrypting.

Herein, the processor 140 may transmit the HDCP state information through the auxiliary channel included in the output connector 130.

From the source apparatus connected with the input connector 120 or the a display apparatus, the processor 140 may receive HDCP state information which indicates whether to decrypt and re-encrypt an image received from the apparatus connected with the output connector 120 to transmit the image to another display apparatus. Herein, the processor 140 may determine whether to re-encrypt the image to be transmitted to the first display apparatus based on the HDCP state information. When the HDCP state information is analyzed, if it is determined that the image to be transmitted to the first display apparatus needs to be re-encrypted, the processor 140 re-encrypts the image according to the method by which the image received from the apparatus connected through the input connector of the display apparatus 100, transmits the image to the first display apparatus and also transmits the HDCP state information indicating that a re-encryption is carried out on the image transmitted to the second display apparatus, to the first display apparatus. If it is determined that a re-encryption is not necessary, the re-encryption is not carried out, and the HDCP state information indicating that a re-encryption regarding an image to be transmitted to the second display apparatus is not carried out is transmitted to the first display apparatus.

Figure 2:
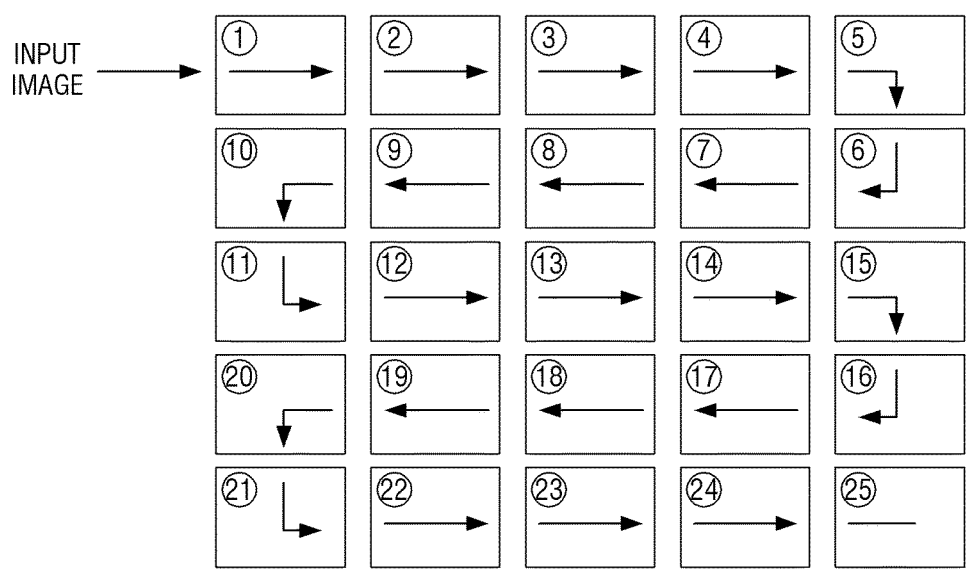
FIG. 2 is a diagram illustrating an example signal flow of a multi-display system according to an example embodiment.

FIG. 2 is a diagram illustrating an example signal flow of a multi-display system according to an example embodiment.

Referring to FIG. 2, with respect to a video wall system including, for example, and without limitation, 5×5 display apparatuses which are connected with a pair of input connector and output connector, a first display apparatus receives an image signal from a source apparatus. If the first display apparatus receives the image signal, the image signal is output through an output connector which is located at the right side of the first display apparatus and input through an input connector which is located at the left side of an adjacent second display apparatus.

The image signal is output through an output connector which is located at the right side of the second display apparatus and input to an input connector which is located at the left side of an adjacent third display apparatus. Therefore, respective display apparatuses are serially connected through a plurality of pairs, each of the pairs including an input connector and an output connector, and an image signal input to the first display apparatus may be transmitted to a 25th display apparatus.

However, the signal flow illustrated in FIG. 2 is merely example, and the image signal that is input to the first display apparatus may be transmitted to the 25th display apparatus after passing through the 10th display apparatus, the 11th display apparatus, the 20th display apparatus, the 21st display apparatus, the 22nd display apparatus, and the 19th display apparatus in order.

In an example embodiment, a video wall system including various numbers of display apparatuses may be embodied as a 10×10 display video wall system in addition to the video wall system with 5×5 display apparatuses.

Figure 3:
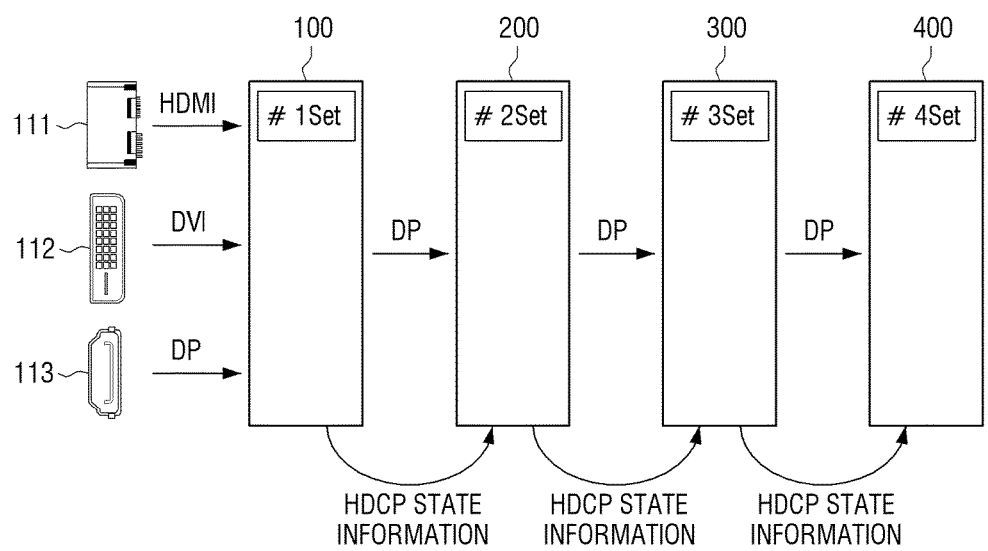
FIG. 3 is a diagram illustrating an example multi-display system connected by an input connector and an output connector according to an example embodiment.

FIG. 3 is a diagram illustrating an example multi-display system connected by an input connector and an output connector according to an example embodiment.

In FIG. 3, #1Set to #4Set indicate portions of a plurality of display apparatuses configuring a video wall, and respective display apparatuses 100, 200, 300 and 400 may consecutively receive an input of an image, process and output the image. Each of the display apparatuses may include various types of input connector such as a HDMI 111, DVI 112, DP 113 and the like.

The display apparatus 100 may receive inputs of various types of images from a source apparatus, convert the images to the DP types and transmit the DP types of images to the adjacent first display apparatus 200. Specifically, the processor 140 enables a type conversion by managing an audio signal and a video signal between the HDMI type or the DVI type and the DP type, and for this, a DP converter may be further included. The image which is once converted into the DP type is transmitted to the second display apparatus 300 and the third display apparatus 400 which are consecutively connected.

Figure 4:
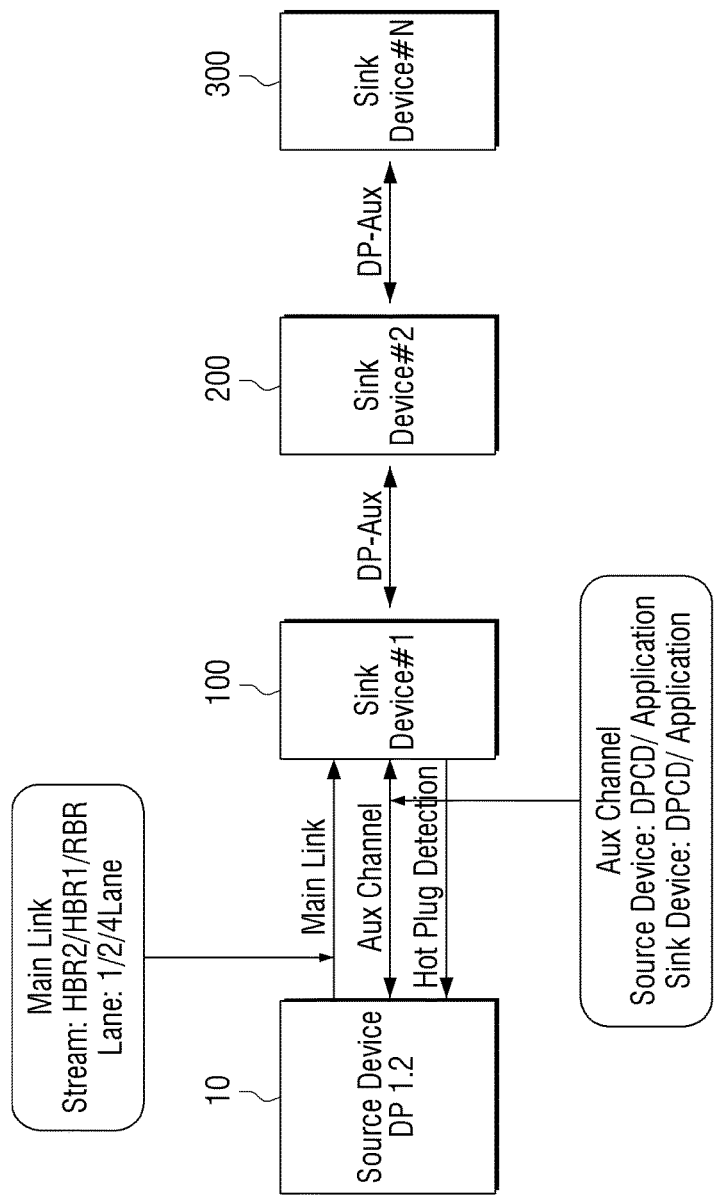
FIG. 4 is a diagram illustrating an example auxiliary channel for transmitting HDCP state information according to example embodiment.

FIG. 4 is a diagram illustrating an example auxiliary channel for transmitting HDCP state information according to example embodiment.

FIG. 4 illustrates that a video wall system transmits an image through a DP type input connector and a DP type output connector. According to FIG. 4, to transmit an image and audio, a DP uses a main link, an auxiliary channel and a hot plug detection line, and respective display apparatuses of the video wall system pertain to sink apparatuses 100, 200 and 300 illustrated in FIG. 4.

The main link is a main transmission channel of stream data, i.e., a one-way high-speed channel for isochronous stream transmission. The main link may be used as one, two or four lanes and is configured as a differential pair. The main link may have a bit rate of 2.7 Gbps or 1.6 Gbps per lane. To provide an isochronous transmission service, a source apparatus 10 converts and re-configures an image and an audio signal to be transmitted through the main link, and transmits the re-configured image and audio signal to each of the sink apparatuses 100, 200 and 300.

The auxiliary channel provides a link service to configure and maintain the main link. In addition, the auxiliary channel provides a service to check whether each of the sink apparatuses 100, 200 and 300 can indicate the data transmitted from the source apparatus 10 without any problems.

A hot plug detection (HPD) line is a signal line to inform a connection of sink apparatuses 100, 200 and 300, and the source apparatus 10, and is used to check the connection of the respective sink apparatuses 100, 200 and 300. A HPDS notifies the source apparatus of an event such as an Interrupt Request (IRQ), Unplug, Plug/Re-Plug, or the like.

The processor 140 may transmit HDCP state information through an auxiliary channel included in the output connector 130. The HDCP state is transmitted through the auxiliary channel between each of the sink apparatuses 100, 200 and 300, and each of the sink apparatuses 100, 200 and 300 may determine whether to re-encrypt an input image according to the HDCP state information which is received in advance before the image is received through each input connector, and may perform an preparing operation according to the determined result. Based on information such as VBID included in the HDCP state information, each of the sink apparatuses 100, 200 and 300 may determine whether the image to be input is an encrypted image based on the HDCP or not, and if it is determined that the image to be input is an encrypted image, each of the sink apparatuses may be pre-set to perform a re-encryption with respect to the image. However, according to a user command input through a user interface 180, if HDCP state information including the information that a re-encryption is not performed is received from a connected display apparatus, a re-encryption is not carried out.

Figure 5:
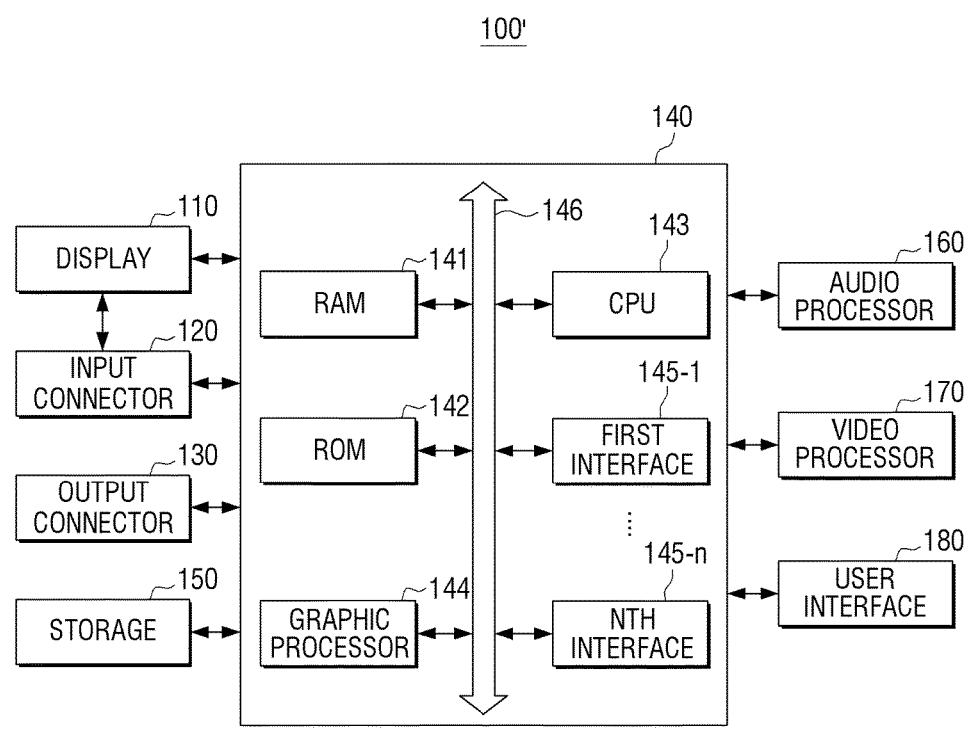
FIG. 5 is a block diagram illustrating an example configuration of a display apparatus configuring a multi-display system according to another example embodiment.

FIG. 5 is a block diagram illustrating an example configuration of a display device configuring a multi-display system according to another example embodiment. As illustrated in FIG. 5, a display apparatus 100' according to the another example embodiment includes a display 110, an input connector 120, an output connector 130, a processor (e.g., including processing circuitry) 140, a storage 150, an audio processor (e.g., including audio processing circuitry) 160, a video processor (e.g., including video processing circuitry) 170, and a user interface (e.g., including user interface circuitry) 180. Hereinafter, explanations on portions overlapping with the explanations with respect to FIG. 1 may not be repeated.

The storage 150 stores various modules to operate the display apparatus 100'.

Specifically, the storage 150 may store a base module that processes signals that are transferred from respective pieces of hardware included in the display apparatus 100', a storage module that manages a database (DB) or registries, a security module, and a communication module.

The audio processor 160 may include various audio processing circuitry and is an element for processing audio data.

The video processor 170 may include various video processing circuitry and performs various types of image-processing, such as decoding, scaling, noise filtering, frame rate converting, resolution converting, and the like, with respect to an input image.

The user interface 180 may include various interface circuitry that senses a user interaction for controlling overall operation of the display apparatus 100'. The user interface 180 may include various interaction detection apparatuses such as a camera (not illustrated), a microphone (not illustrated), a remote controller signal receiver (not illustrated) and the like. Specifically, the user interface 180 may receive a user command regarding whether to encrypt an image and transmit the encrypted image, input from a remote controller through a remote controller signal receiver, and may generate HDCP state information generated based on the received user command.

The processor 140 may include various processing circuitry and control overall operation of the display apparatus 100' using various modules stored in the storage 150.

The processor 140, as illustrated in FIG. 5, may include a RAM 141, a ROM 142, a CPU 143, a graphic processor 144 and a first to nth interfaces 145-1~145-n, etc. The RAM 141, the ROM 142, the CPU 143, the graphic processor 144 and the first to nth interfaces 145-1~145-n, etc. may be connected to each other through a bus 146.

In the ROM 142, a set of commands for booting the system is stored. The CPU 143 copies various kinds of application programs stored in the storage 150 to the RAM 141, and executes the application programs copied to the RAM 141 to perform various kinds of operations.

The graphic processor 144 generates a screen including various objects, such as icons, images, and texts, using an operator (not illustrated) and a renderer (not illustrated). The operator calculates attribute values, such as coordinate values, shapes, sizes, colors, etc., at which the objects are to be respectively displayed according to a layout of the screen. The renderer generates screens of various layouts including objects based on the attribute values that are operated by the operator.

The CPU 143 accesses the storage 150 and performs booting using the OS stored in the storage 150. Further, the CPU 143 performs various operations using various kinds of programs, contents, and data stored in the storage 150.

The first to n-th interfaces 145-1 to 145-n are connected to the variety of components described above. One of the interfaces may be a network interface connected to an external apparatus via network.

Figure 6:
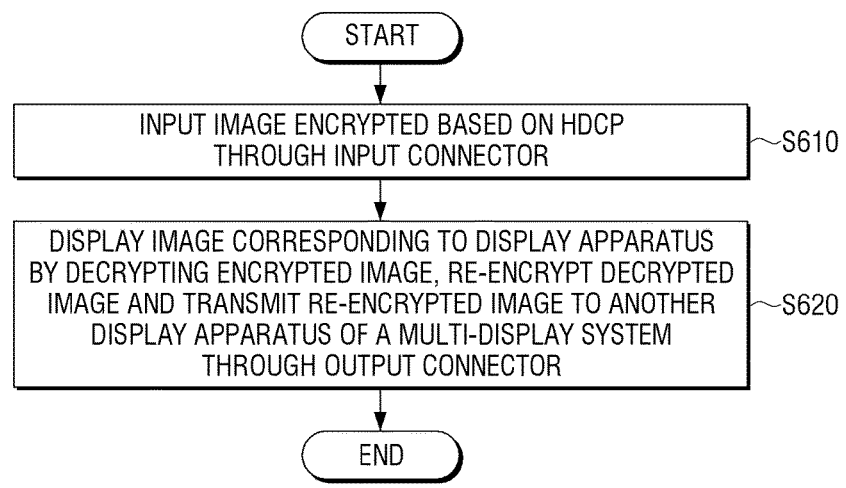
FIG. 6 is a flowchart illustrating an example method for controlling a display apparatus configuring a multi-display system according to an example embodiment.

FIG. 6 is a flowchart illustrating an example method for controlling a display apparatus of a multi-display system according to an example embodiment.

An image encrypted based on HDCP through an input connector is received as an input (S610).

The encrypted image is decrypted and an image corresponding to a display apparatus is displayed, and the decrypted image is re-encrypted and transmitted to another display apparatus configuring a multi-display system through an output connector (S620).

At step S620, HDCP state information which indicates whether a first display apparatus which receives the re-encrypted image through the output connector decrypts and re-encrypts the image received from the display apparatus and transmits the image to a second display apparatus connected to the first display apparatus may be transmitted to the first display apparatus.

At step S620, HDCP state information generated based on the input user command or a user command input on a source apparatus may be transmitted to the first display apparatus from any one of a plurality of display apparatuses configuring a multi-display system. Specifically, the HDCP state information may be transmitted through an auxiliary channel included in an output connector.

Before step S610 where the input of the encrypted image is received, receiving, from an apparatus connected with the input connector, HDCP state information which indicates whether to transmit an image received from the apparatus connected with the input connector to the another display apparatus by decrypting and re-encrypting the image, and determining whether to re-encrypt an image which is to be transmitted to the another display apparatus based on the received HDCP state information may be further included.

According to the various example embodiments, a display apparatus configuring a multi-display system has the effect of avoiding an image encrypted based on HDCP being encoded and illegally copied to an external.

The methods for controlling a display apparatus configuring a multi-display system according to the various example embodiments as described above may be implemented by a program and may be stored in various recording media. For example, a computer program that has been processed by various processors and therefore has become capable of executing the aforementioned control methods may be stored in a non-transitory recording medium and be used.

A non-transitory computer readable medium storing a program which includes receiving an input of an image which is encrypted based on HDCP through an input connector, decrypting the encrypted image, displaying an image corresponding to the display apparatus, re-encrypting the decrypted image and transmitting the re-encrypted image to another display apparatus configuring the multi-display system through an output connector, may be provided.

The non-transitory computer readable medium is a medium that stores data and is readable by a device. Specifically, the above-described various applications or programs may be stored in a non-temporal recordable medium such as Compact Disk (CD), DVD, hard disk, Blu-ray disk, Universal Serial Bus (USB), memory card, ROM, and the like, and provided therein.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. A display apparatus of a multi-display system, comprising:
    a display;
    an input interface comprising interface circuitry;
    an output interface comprising interface circuitry; and
    a processor configured to:
        receive an image encrypted based on High-bandwidth Digital Content Protection (MCP) and HDCP state information through the input interface,
        decrypt the received image;
        control the display to display an image corresponding to the display apparatus, the displayed image corresponding to the display comprising a part of the decrypted image; and
        based on the HDCP state information, transmit the decrypted image and HDCP state information to a first display apparatus or re-encrypt the decrypted image and transmit the re-encrypted image and HDCP state information to the first display apparatus;
    wherein the HDCP state information indicates whether the first display apparatus which is to receive the re-encrypted image through the output interface decrypts and re-encrypts the image received from the display apparatus.

2. The apparatus as claimed in claim 1, further comprising:
    a user interface comprising user interface circuitry,
    wherein the processor is configured to transmit the HDCP state information generated based on a user command input through the user interface to the first display apparatus.

3. The apparatus as claimed in claim 1, wherein the processor is configured to transmit the HDCP state information through an auxiliary channel included in the output interface.

4. The apparatus as claimed in claim 1, wherein the input interface is configured to receive, from an apparatus connected with the input interface.

5. The apparatus as claimed in claim 1, wherein the input interface includes at least one of: a High Definition Multimedia Interface (HDMI), a Digital Video/visual Interface (DVI) and a display port (DP), and
    wherein the output interface includes a DP.

6. A method of controlling a display apparatus of a multi-display system, the method comprising:
    receiving an image encrypted based on High-bandwidth Digital Content Protection (HDCP) and HDCP state information;
    decrypting the received image;
        displaying an image corresponding to the display apparatus, the displayed image corresponding to the display comprises a part of the decrypted image, and based on the HDCP state information, transmitting the decrypted image and HDCP state information to a first display apparatus or re-encrypting the decrypted image and transmitting the re-encrypted image and HDCP state information to the first display apparatus; and
    wherein the HDCP state information indicates whether the first display apparatus which is to receive the re-encrypted image is to decrypt and re-encrypt the image received from the display apparatus.

7. The method as claimed in claim 6, wherein the transmitting comprises transmitting the HDCP state information generated based on a user command to the first display apparatus.

8. The method as claimed in claim 6, wherein the transmitting comprises transmitting the HDCP state information through an auxiliary channel included in an output interface.

9. The method as claimed in claim 6, further comprising:
    receiving, from an apparatus connected with an input interface of the display apparatus.

10. The method as claimed in claim 9, wherein the input interface includes at least one of: an HDMI, a DVI and a DP, and
    wherein an output interface of the display apparatus includes a DP.

11. A multi-display system including a plurality of display apparatuses, the system comprising:
    a first display apparatus configured to transmit an image encrypted based on HDCP and HDCP state information to a second display apparatus; and
    the second display apparatus configured to:
        decrypt the received image,
        display an image corresponding to the second display apparatus, the displayed image corresponding to the second display apparatus comprising a part of the decrypted image, and
        based on the received HDCP state information, determine whether to re-encrypt the decrypted image, and to transmit the decrypted image or a re-encrypted image based on a determination result, to a third display apparatus;
    wherein the HDCP state information indicates whether a display apparatus which is to receive the re-encrypted image decrypts and re-encrypts the image received.

* * * * *